E. RIMAILHO.
DETACHABLE AUTOMOBILE CATERPILLAR.
APPLICATION FILED JULY 27, 1917.
1,317,103.
Patented Sept. 23, 1919.
Fig. 1
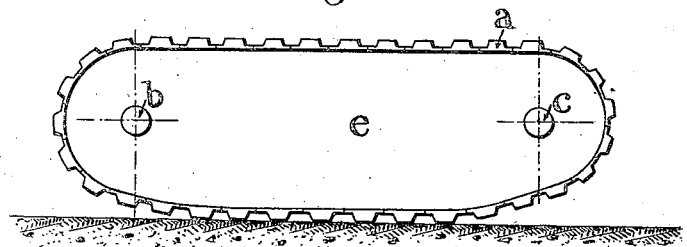
Fig. 2
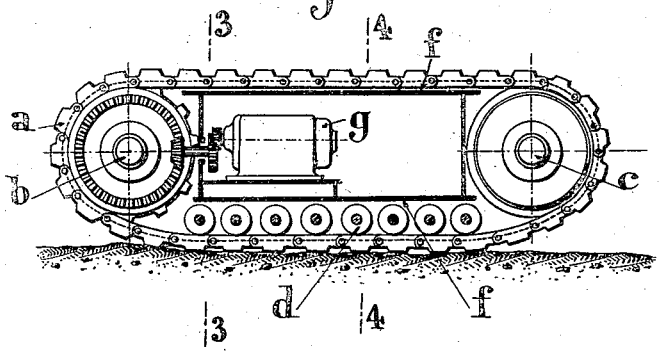
Fig. 3     Fig. 4     Fig. 5
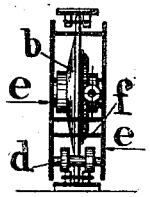 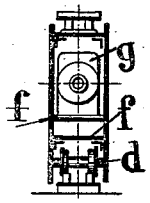 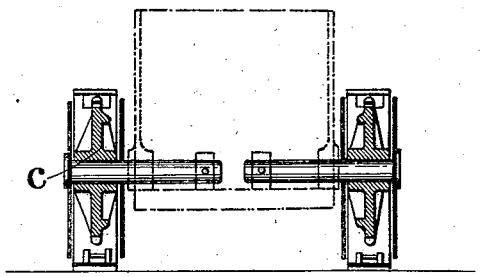
WITNESSES
Joseph Nagy
B. Joffe
INVENTOR
Emile Rimailho
BY
ATTORNEYS

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

DETACHABLE AUTOMOBILE CATERPILLAR.

1,317,103.                            Specification of Letters Patent.       Patented Sept. 23, 1919.

Application filed July 27, 1917. Serial No. 183,201.

*To all whom it may concern:*

Be it known that I, EMILE RIMAILHO, a citizen of the French Republic, and residing in Paris, France, 98 Rue de la Victorie, consulting engineer, have invented certain new and useful Improvements in and Relating to Detachable Automobile Caterpillars, of which the following is a complete specification.

The present caterpillar vehicles all have certain disadvantages in common. On the one hand the caterpillar device whether it is a question of the caterpillars on articulated carriages or of the caterpillars on rigid frames, is integral with the general construction of the vehicle in such a way that the dismounting of a caterpillar keeps the vehicle stationary for rather a long time or the replacing of one type of caterpillar by another having a different bearing surface or different links, or on account of deterioration of its supports, is an operation which it is almost impossible to carry out on the spot which involves at the very least a very long dismounting and sometimes actual alterations to the chassis of the vehicle.

On the other hand, in the present caterpillar vehicles, the motor set is placed on the chassis of the vehicle and its energy is communicated to the driving wheels of the caterpillars by mechanical transmissions which complicate the connecting of the caterpillar device to the chassis.

This invention eliminates these disadvantages, and permits of the prompt replacement from any cause whatever of one caterpillar by another on the spot.

This substitution moreover is rendered prompt by suitable connecting members.

The invention consists of a caterpillar which is at the same time automobile and detachable, in which the motor which actuates it is arranged inside the perimeter of the chain with a view to forming a unit which is at the same time motor, automobile and detachable.

In the accompanying drawing, which illustrates by way of example one constructional form of the invention:—

Figure 1 is a side elevation of an automobile caterpillar.

Fig. 2 is a view of an automobile caterpillar with one cheek removed so as to show the interior.

Fig. 3 is a cross section along the line 3—3 of Fig 2.

Fig. 4 is a cross section along the line 4—4 of Fig. 2.

Fig. 5 illustrates the arrangement for connecting the caterpillar to the vehicle.

Referring to the drawings, $e$ $e$ are the side plates or cheeks of the frame which are spaced by a substantially rectangular frame $f$ disposed between the ends of the side plates and slightly higher from the lower edge of the plates to accommodate between the plates and below the frame a series of rollers $d$ which bear on the links of an endless chain $a$. The chain is engaged by a toothed wheel or sprocket $b$ which has a gear whereby it may be geared to a motor $g$ mounted in the frame $f$. The gear bears on an axle carried by the side plates. A wheel $c$ is also mounted at the other end of the side plates to engage the chain $a$ and whereby the tension of the chain may be varied. The top of the frame $f$ serves as a support for the chain, if so desired. The current may be supplied to the motor from the vehicle to which the self-actuating caterpillars are fitted, or from a neighboring trailer.

In order to insure satisfactory working of the caterpillar the shoes of the caterpillar may be guided by internal or external portions sliding over the rims of the cheeks. The tension of the caterpillar may be obtained in the usual way by the stretching wheel mounted either on a bed with tension screw, or on an eccentric forming an axle of the wheel and braced between the cheeks. The tension of the caterpillar may also be obtained by one or more spring-pressure or hand-adjusted stretching rollers.

In the constructional form (Fig. 5) the hollow axles of the driving and tightening wheels form stays between the cheek as well as hubs of the axles that carry the chassis of the vehicle.

The invention is adaptable to all types of caterpillars, to fixed-frame or to articulated-carriage caterpillars for example.

The motor may be an electric, hydraulic of mechanical motor or even a heat engine (steam, or internal combustion).

What I claim is:—

1. A detachable automobile caterpillar particularly applicable to the vehicles that transport heavy ordnance, consisting of a frame comprising side plates, top and bottom plates connecting the same, an endless traction element including links or shoes, and traveling around said frame, a driving wheel at one end of said frame, a caterpillar stretching wheel at the opposite end, said driving wheel and stretching wheel engaging said links or shoes, rollers beneath said frame having rolling contact with said links or shoes, a motor supported by and carried within said frame, and means operatively connecting said motor with the driving wheel.

2. A detachable automobile caterpillar particularly applicable to vehicles that transport heavy ordnance, consisting of a frame comprising side plates and top and bottom plates connecting the same, links or shoes traveling around said frame, a drive wheel mounted in said frame, a caterpillar stretching wheel also mounted in said frame the said links or shoes engaged by said wheels, a horizontally disposed series of rollers mounted in said frame and having rolling contact with said links or shoes, a motor supported within said frame and gear means operably connecting said motor with said drive wheel.

3. A detachable automobile caterpillar particularly applicable to the vehicles that transport heavy ordnance, consisting of a frame, links or shoes, a driving wheel at one end of the frame, a caterpillar stretching wheel mounted in the frame, rollers mounted beneath the frame, a motor located within the frame in the internal perimeter of the caterpillar between the axles of the driving wheel and stretching wheel.

4. A detachable automobile caterpillar particularly applicable to the vehicles that transport heavy ordnance, consisting of a frame, endless links or shoes traveling thereon, a driving wheel, and a caterpillar stretching wheel carried in said frame, rollers suspended from said frame, an electric motor located in the internal perimeter of the caterpillar, and connected to a power generating plant.

5. A detachable automobile caterpillar comprising side plates, a frame spacing said side plates, an endless chain, wheels revolubly mounted in the side plates engaging said chain, a motor mounted in the frame and adapted to impart rotary motion to one of said wheels, and rolls revolubly mounted in said side plates and adapted to bear on said chain.

6. A detachable automobile caterpillar comprising side plates, a rectangular frame spacing said side plates, a chain adapted to travel between the side plates about said frame, wheels revolubly mounted in said side plates outside of the frame for engaging the chain, a motor in the frame for imparting rotary motion to one of said wheels, and rolls revolubly mounted in the plates below the frame for bearing on the chain.

In testimony whereof I have hereunto set my hand at S'-Etienne, (France), this 20th day of June 1917.

EMILE RIMAILHO.

Witnesses:
  JEAN BRNYERSY,
  DAVIS B. LEVIS.